(12) United States Patent
Bhatnagar et al.

(10) Patent No.: US 9,138,961 B2
(45) Date of Patent: Sep. 22, 2015

(54) HIGH PERFORMANCE LAMINATED TAPES AND RELATED PRODUCTS FOR BALLISTIC APPLICATIONS

(71) Applicant: Honeywell International Inc., Morristown, NJ (US)

(72) Inventors: Ashok Bhatnagar, Richmond, VA (US); Brian Duane Arvidson, Chester, VA (US); Henry Gerard Ardiff, Chesterfield, VA (US); Charles Arnett, Richmond, VA (US); David A. Hurst, Richmond, VA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 304 days.

(21) Appl. No.: 13/647,926

(22) Filed: Oct. 9, 2012

(65) Prior Publication Data

US 2013/0101787 A1    Apr. 25, 2013

Related U.S. Application Data

(60) Provisional application No. 61/549,004, filed on Oct. 19, 2011.

(51) Int. Cl.
| | |
|---|---|
| *D03D 15/00* | (2006.01) |
| *B32B 5/12* | (2006.01) |
| *D03D 11/00* | (2006.01) |
| *D01G 25/00* | (2006.01) |
| *D03D 1/00* | (2006.01) |
| *D03D 13/00* | (2006.01) |

(52) U.S. Cl.
CPC *B32B 5/12* (2013.01); *D01G 25/00* (2013.01); *D03D 1/0052* (2013.01); *D03D 11/00* (2013.01); *D03D 13/008* (2013.01); *D03D 15/00* (2013.01); *D03D 15/0088* (2013.01); *D10B 2331/021* (2013.01); *Y10T 428/24* (2015.01); *Y10T 428/24132* (2015.01); *Y10T 442/3033* (2015.04)

(58) Field of Classification Search
CPC ............... Y10T 428/24124; Y10T 428/24
USPC .................................... 428/114, 98
See application file for complete search history.

(56) References Cited

U.S. PATENT DOCUMENTS

| | | |
|---|---|---|
| 2,035,138 A | 3/1936 | Maxfield |
| 4,124,420 A | 11/1978 | Pastorelli et al. |
| 4,413,110 A | 11/1983 | Kavesh et al. |
| 4,541,461 A | 9/1985 | Villa |
| 4,748,064 A | 5/1988 | Harpell |
| 4,996,011 A | 2/1991 | Sano et al. |
| 5,002,714 A | 3/1991 | Sano et al. |
| 5,091,133 A | 2/1992 | Kobayashi et al. |
| 5,106,555 A | 4/1992 | Kobayashi et al. |
| 5,115,839 A | 5/1992 | Speich |
| 5,135,804 A | 8/1992 | Harpell et al. |
| 5,200,129 A | 4/1993 | Kobayashi et al. |
| 5,564,477 A | 10/1996 | Probst |
| 5,578,373 A | 11/1996 | Kobayashi et al. |
| 5,628,946 A | 5/1997 | Ward et al. |
| 6,017,834 A | 1/2000 | Ward et al. |
| 6,328,923 B1 | 12/2001 | Jones et al. |
| 6,458,727 B1 | 10/2002 | Jones et al. |
| 6,642,159 B1 | 11/2003 | Bhatnagar |
| 6,841,492 B2 | 1/2005 | Bhatnagar |
| 6,951,685 B1 | 10/2005 | Weedon et al. |
| 7,279,441 B2 | 10/2007 | Jones et al. |
| 7,300,691 B2 | 11/2007 | Callaway et al. |
| 7,451,787 B2 | 11/2008 | Speich |
| 7,470,459 B1 | 12/2008 | Weedon et al. |
| 7,740,779 B2 | 6/2010 | Harding et al. |
| 7,857,012 B2 | 12/2010 | Speich et al. |
| 7,964,266 B2 | 6/2011 | Harding et al. |
| 7,964,267 B1 | 6/2011 | Lyons et al. |
| 7,964,518 B1 | 6/2011 | Bhatnagar |
| 7,976,930 B2 | 7/2011 | Weedon et al. |
| 8,236,119 B2 | 8/2012 | Tam et al. |
| 2008/0156345 A1 | 7/2008 | Snijder et al. |
| 2009/0007981 A1* | 1/2009 | Khokar ................ 139/383 A |
| 2010/0260968 A1 | 10/2010 | Marissen et al. |
| 2010/0275764 A1 | 11/2010 | Egres, Jr. |
| 2011/0192530 A1 | 8/2011 | Arvidson et al. |
| 2012/0121852 A1 | 5/2012 | Tam et al. |

FOREIGN PATENT DOCUMENTS

| | | | |
|---|---|---|---|
| EP | 0483780 A2 | 5/1992 | |
| WO | 2008124257 | 10/2008 | |
| WO | WO 2008148791 A1 * | 12/2008 | ............. D04H 13/00 |

* cited by examiner

*Primary Examiner* — Brent O'Hern
(74) *Attorney, Agent, or Firm* — Roberts & Roberts, LLP

(57) ABSTRACT

Highly uniform woven fibrous structures formed from fibrous tapes, wherein the tapes constitute the warp and weft tapes of a woven fabric. The individual fibrous tapes may be woven or non-woven, and may be formed as narrow tapes or may be cut from a wider fabric web.

20 Claims, No Drawings

1

HIGH PERFORMANCE LAMINATED TAPES AND RELATED PRODUCTS FOR BALLISTIC APPLICATIONS

CROSS-REFERENCE TO RELATED APPLICATIONS

This application claims the benefit of U.S. Provisional Application Ser. No. 61/549,004, filed on Oct. 19, 2011, the disclosure of which is incorporated by reference herein in its entirety.

BACKGROUND OF THE INVENTION

1. Field of the Invention

This invention relates to highly uniform woven fibrous structures formed from tapes of woven fabric, tapes of non-woven fabrics, or tapes of non-woven, unidirectionally oriented fiber arrays, as well as processes for their fabrication.

2. Description of the Related Art

Ballistic resistant articles fabricated from composites comprising high strength synthetic fibers are well known. Articles such as bullet resistant vests, helmets, vehicle panels and structural members of military equipment are typically made from fabrics comprising high strength fibers such as SPECTRA® polyethylene fibers or aramid fibers such as KEVLAR® and TWARON®. For many applications, such as vests or parts of vests, the fibers may be used in a woven or knitted fabric. For other applications, the fibers may be encapsulated or embedded in a polymeric matrix material and formed into non-woven fabrics. For example, in one common non-woven fabric structure, a plurality of unidirectionally oriented fibers are arranged in a generally co-planar relationship and coated with a matrix material to bind the fibers together. Typically, multiple plies of such unidirectionally oriented fibers are merged into a multi-ply composite. See, for example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, which describe ballistic resistant composites including multiple plies of non-woven fiber plies.

To maximize ballistic resistance of fibrous ballistic resistant composite articles, it is desired for there to be minimal space between adjacent fibers to facilitate maximum engagement of the fibers with a projectile impact. One way to accomplish this is by incorporating more fibers or fiber layers within a composite. However, increasing fiber content makes the armor heavier, which is undesirable. Another way to achieve a minimum of space between fibers, particularly when fabricating non-woven materials from parallel fibers, is to spread out the fibers or their component filaments so that fewer fibers lie on top of each other. This allows a greater number of fiber layers or unidirectional fiber plies to be stacked on top of each other without altering the expected composite thickness, which enhances fiber engagement with projectile threats without increasing fabric weight.

When spreading fibers, however, it remains difficult to eliminate all fiber overlap in a single unidirectional fiber array, especially when spreading continuous fibers. Additionally, when arranging fibers into parallel arrays, with or without the aid of fiber spreading, it is difficult to maintain fiber uniformity across the entire width of the array, particularly when orienting long continuous fibers. Unidirectional arrays of fibers are typically processed as continuous fiber webs that are several kilometers in length and several centimeters wide. The substantial length of the fibers makes it difficult to maintain uniform fiber orientation along the entire width of the array during processing. This is problematic, because fiber non-uniformity in an array leads to uneven and unpredictable ballistic performance. In addition, processing large fiber webs requires the use of expensive equipment, which can be prohibitive for composite manufacture on a commercial scale.

It would be desirable to provide fibrous composites having reduced thickness and improved fiber uniformity, which may result in greater engagement with projectiles and improved ballistic resistance properties. It would also be desirable to provide a method for producing such composites that allows the use of less expensive processing equipment. The invention provides a solution to each of these needs.

SUMMARY OF THE INVENTION

The invention provides a woven fabric comprising a plurality of fibrous tapes, each fibrous tape comprising a plurality of fibers arranged in a unidirectional, substantially parallel array or arranged as a woven fabric strip, said fibers optionally being at least partially coated with a polymeric binder material, wherein each of said fibers have a tenacity of about 7 g/denier or more and a tensile modulus of about 150 g/denier or more, wherein each fiber comprises a plurality of filaments, and wherein said polymeric binder material when present comprises less than 40% by weight of each fibrous tape.

The invention also provides a method of forming a ballistic resistant woven fabric comprising:

a) providing a plurality of fibrous tapes, each fibrous tape comprising a plurality of fibers arranged in a unidirectional, substantially parallel array or arranged as a woven fabric strip, said fibers optionally being at least partially coated with a polymeric binder material, wherein each of said fibers have a tenacity of about 7 g/denier or more and a tensile modulus of about 150 g/denier or more, wherein each fiber comprises a plurality of filaments, and wherein said polymeric binder material when present comprises less than 40% by weight of each fibrous tape; and b) weaving said plurality of fibrous tapes together to thereby form a woven fabric.

The invention still further provides a multi-layer, ballistic resistant composite comprising a consolidated plurality of woven fabrics, each woven fabric comprising a plurality of fibrous tapes, each fibrous tape comprising a plurality of fibers arranged in a unidirectional, substantially parallel array or arranged as a woven fabric strip, said fibers optionally being at least partially coated with a polymeric binder material, wherein each of said fibers have a tenacity of about 7 g/denier or more and a tensile modulus of about 150 g/denier or more, wherein each fiber comprises a plurality of filaments, and wherein said polymeric binder material when present comprises less than 40% by weight of each fibrous tape.

DETAILED DESCRIPTION OF THE INVENTION

As used herein, the term "tape" refers to a narrow strip of fibrous material comprising a plurality of fibers or yarns. The tape may comprise a strip of woven fabric, or may comprise a plurality of fibers or yarns arranged in a generally unidirectional array of generally parallel fibers, and where the fibers/yarns are optionally but preferably coated with a polymeric binder resin. Such tapes are fabricated into a woven fabric where they constitute the warp and weft tapes of a woven fabric.

In a particularly preferred embodiment, a merger of both woven and non-woven fabric technologies are employed to fabricate woven fibrous composites where non-woven, multi-fiber (or multi-yarn) tapes constitute the warp and weft tapes in a woven fabric. These fibrous composites are useful for the manufacture of both soft and hard armor articles. The mechanical interlocking of the fibers through weaving and optional adhesive interlocking with a polymeric binder material allows for the polymeric binder content to be reduced relative to conventional non-woven materials without sacrificing ballistic resistance performance.

A tape may be fabricated directly by combining a plurality of fibers or yarns into a thin, narrow structure. Alternatively, a tape may be fabricated by first forming a unidirectional fiber ply, non-woven fabric or non-woven fiber layer incorporating a plurality of unidirectional fiber plies, or a woven fabric or woven fiber layer, followed by slicing or cutting thin strips from the fiber ply, fiber layer or fabric, where each strip constitutes a single tape.

The tapes are preferably flat structures having a preferred thickness of up to about 3 mils (76.2 μm), more preferably from about 0.35 mil (8.89 μm) to about 3 mils (76.2 μm), and most preferably from about 0.35 mil to about 1.5 mils (38.1 μm). A tape generally has a width less than or equal to about 6 inches (15.24 cm), with a preferred width of from about 5 mm to about 50 mm, more preferably from about 5 mm to about 25.4 mm (1 inch), even more preferably from about 5 mm to about 20 mm, and most preferably from about 5 mm to about 10 mm. Each fibrous tape will include at least two fibers, preferably from 2 to about 20 fibers, more preferably from about 2 to about 15 fibers, and most preferably from about 5 to about 10 fibers.

As used herein, the term "fiber" is an elongate body the length dimension of which is much greater than the transverse dimensions of width and thickness. The cross-sections of fibers for use in this invention may vary widely, and they may be circular, flat or oblong in cross-section. Thus the term "fiber" includes filaments, ribbons, strips and the like having regular or irregular cross-section, but it is preferred that the fibers have a substantially circular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. As used herein, the term "yarn" is defined as a single strand consisting of multiple fibers.

As used herein, a "layer" describes a generally planar arrangement of fibers and a "fiber layer" may comprise a single-ply of unidirectionally oriented fibers, a plurality of plies of unidirectionally oriented fibers, a woven fabric, or any other fabric structure that has been formed from a plurality of fibers, including felts, mats and other structures, such as those comprising randomly oriented fibers. Each fiber ply, fiber layer and tape will have both an outer top surface and an outer bottom surface.

As is conventionally known in the art, a "single-ply" of unidirectionally oriented fibers comprises an arrangement of generally non-overlapping, coplanar fibers that are aligned in a substantially parallel, unidirectional, side-by-side array of fibers. This type of fiber arrangement is also known in the art as a "unitape", "unidirectional tape", "UD" or "UDT." As used herein, an "array" describes an orderly arrangement of fibers or yarns, which is exclusive of woven fabrics, and a "parallel array" describes an orderly parallel arrangement of fibers or yarns. The term "oriented" as used in the context of "oriented fibers" refers to the alignment of the fibers as opposed to stretching of the fibers. The term "fabric" describes structures that may include one or more fiber plies, with or without molding or consolidation of the plies. For example, a woven fabric or felt may comprise a single fiber ply. A non-woven fabric formed from unidirectional fibers typically comprises a plurality of fiber plies stacked on each other and consolidated. When used herein, a "single-layer" structure refers to any monolithic fibrous structure composed of one or more individual plies or individual layers that have been merged, i.e. consolidated by low pressure lamination or by high pressure molding, into a single unitary structure together with a polymeric binder material. By "consolidating" it is meant that the polymeric binder material together with each fiber ply is combined into a single unitary layer. Consolidation can occur via drying, cooling, heating, pressure, calendering or a combination thereof. Heat and/or pressure may not be necessary, as the fibers or fabric layers may just be glued together, as is the case in a wet lamination process. The term "composite" refers to combinations of fibers with at least one polymeric binder material. A "complex composite" as used herein refers to a consolidated combination of a plurality of fiber layers. As described herein, "non-woven" fabrics include all fabric structures that are not formed by weaving. For example, non-woven fabrics may comprise a plurality of unitapes that are at least partially coated with a polymeric binder material, stacked/overlapped and consolidated into a single-layer, monolithic element, as well as a felt or mat comprising non-parallel, randomly oriented fibers that are preferably coated with a polymeric binder composition. For the purposes of the invention, articles that have superior ballistic penetration resistance describe those which exhibit excellent properties against deformable projectiles, such as bullets, and against penetration of fragments, such as shrapnel.

Non-woven tapes may be fabricated using techniques that are conventionally used in the art for forming non-woven, unidirectional fiber plies or unidirectional fiber layers. In a typical process for forming non-woven, unidirectional fiber plies, fiber bundles are supplied from a creel and led through guides and one or more spreader bars into a collimating comb, followed by optionally, but preferably, coating the fibers with a polymeric binder material. Alternately the fibers can be coated before encountering the spreader bars, or they may be coated between two sets of spreader bars, one before and one after the coating section. A typical fiber bundle (e.g. a yarn) will have from about 30 to about 2000 individual filaments, each fiber typically including, but not limited to, from about 120 to about 360 individual filaments. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. Following fiber spreading and collimating, the fibers of such a parallel array will typically contain from about 3 to 12 fiber ends per inch (1.2 to 4.7 ends per cm), depending on the fiber thickness.

Non-woven, unidirectional fiber plies fabricated according to this method are typically processed to have a width of from about 20" (50.8 cm) to about 70" (177.8 cm), but the process may be restricted or modified to limit the tape width to within the desired range. For example, conventional processing steps may be followed using fewer fiber bundles and spacing the fiber bundles apart as they are led through the guides and spreader bars into the collimating comb, thereby forming thin arrays of fibers. In this embodiment, each fiber bundle supplies a single multi-filament yarn (multi-filament fiber), and thus the width of such thin arrays may be managed by controlling the number of fiber bundles utilized and by controlling the extent of fiber spreading. Each thin array is then preferably coated with a polymeric binder material according to conventional techniques in the art.

Various other means may be used to limit the tapes to the desired widths. For example, a unitape of standard thickness may be cut or slit into tapes having the desired lengths, which is a desired method for producing tapes from multi-ply non-woven fiber layers. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. No. 6,098,510 and U.S. Pat. No. 6,148,871 are incorporated herein by reference to the extent consistent herewith.

In another method, continuous non-woven tapes having the desired width may be fabricated by passing the array of fibers/yarns to a shaping apparatus having a shaping die. For example, the plurality of fibers/yarns may be advanced through a shaping die of rectangular cross section to form flat, rectangular tapes. Other cross-sectional shapes may be employed as desired. The fibers may be coated with a polymeric binder or resin material either prior to or after shaping the plurality of fibers. Preferably, the fibers are coated with a binder/resin prior to passing them through the shaping die to help retain the shape. In this regard, the binder/resin is preferably not fully cured as the fibers pass through the die.

Methods for fabricating non-woven fibrous tapes are also described, for example, in U.S. Pat. No. 8,236,119 entitled "High Strength Ultra-High Molecular Weight Polyethylene Tape Articles" and U.S. patent application Ser. No. 13/021,262 filed on Feb. 4, 2011 also entitled "High Strength Tape Articles From Ultra-High Molecular Weight Polyethylene," the disclosures of which are incorporated herein by reference.

In an alternative embodiment where the tapes comprise thin strips of woven fabrics, it is also typical for woven fabrics that are intended for use in ballistic resistant materials to be processed to have a width of from about 20" (50.8 cm) to about 70" (177.8 cm). As with the non-woven materials, a woven fabric of standard thickness (e.g. a broadloom fabric) may be cut or slit into tapes having the desired lengths, such as by using a slitting apparatus as disclosed, for example, in U.S. Pat. Nos. 2,035,138; 4,124,420; 5,115,839; 6,098,510 or 6,148,871, each of which is incorporated herein by reference to the extent consistent herewith. It is also known to form ribbons and similar narrow structures by weaving thin strips of fabric rather than cutting strips from a broadloom fabric, which generally may be accomplished by adjusting the settings on any conventional weaving machine, such as those disclosed in U.S. Pat. Nos. 2,035,138; 4,124,420; 5,115,839, or by use of a ribbon loom specialized for weaving narrow woven fabrics or ribbons. Useful ribbon looms are disclosed, for example, in U.S. Pat. Nos. 4,541,461; 5,564,477; 7,451,787 and 7,857,012, each of which is assigned to Textilma AG of Stansstad, Switzerland, and each of which is incorporated herein by reference to the extent consistent herewith, although any alternative ribbon loom is equally useful. Any conventional method may be employed herein using any fabric weave style where weaving is limited to limit the tape width to within the desired range. However, cutting strips from a broadloom fabric is more efficient and thus preferred. Accordingly, any useful method of forming thin, weavable fabric strips may be employed.

A plurality of tapes are then woven together to form the woven tape-based fabrics. Woven fabrics may be formed using techniques that are well known in the art using any fabric weave, such as plain weave, crowfoot weave, basket weave, satin weave, twill weave and the like. Plain weave is most common, where fibers are woven together in an orthogonal 0°/90° orientation. More preferred are plain weave fabrics having an equal warp and weft count. In one embodiment, the woven fabric preferably has from about 0.25 to about 6 tapes per inch (per 2.54 cm) in both the warp and fill directions, more preferably from about 0.5 to about 6 tapes per inch (per 2.54 cm) in both the warp and fill directions, and most preferably from about 2 to about 6 tapes per inch (per 2.54 cm) in both the warp and fill directions. The result is a woven fabric having a preferred areal density of from about 20 g/m² (gsm) to about 100 gsm, more preferably from about 30 gsm to about 80 gsm, and most preferably from about 35 gsm to about 60 gsm.

The tapes and the fiber layers from which tapes may optionally be cut are preferably formed from high-strength, high tensile modulus polymeric fibers. Most preferably, the fibers comprise high strength, high tensile modulus fibers which are useful for the formation of ballistic resistant materials and articles. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

The polymers forming the fibers are preferably high-strength, high tensile modulus fibers suitable for the manufacture of ballistic resistant composites/fabrics. Particularly suitable high-strength, high tensile modulus fiber materials that are particularly suitable for the formation of ballistic resistant composites and articles include polyolefin fibers, including high density and low density polyethylene. Particularly preferred are extended chain polyolefin fibers, such as highly oriented, high molecular weight polyethylene fibers, particularly ultra-high molecular weight polyethylene fibers, and polypropylene fibers, particularly ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, liquid crystal copolyester fibers and rigid rod fibers such as M5® fibers. Each of these fiber types is conventionally known in the art. Also suitable for producing polymeric fibers are copolymers, block polymers and blends of the above materials.

The most preferred fiber types for ballistic resistant fabrics include polyethylene, particularly extended chain polyethylene fibers, aramid fibers, polybenzazole fibers, liquid crystal copolyester fibers, polypropylene fibers, particularly highly oriented extended chain polypropylene fibers, polyvinyl alcohol fibers, polyacrylonitrile fibers and rigid rod fibers, particularly M5® fibers. Specifically most preferred fibers are aramid fibers.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or U.S. Pat. No. 4,356,138, which are incorporated herein by reference, or may be spun from a solution to form a gel structure, such as described in U.S. Pat. No. 4,551,296 and U.S. Pat. No. 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,623,547 and 4,748,064.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by DuPont under the trademark of KEVLAR®. Also useful in the practice of this invention are poly(m-phenylene isophthalamide) fibers produced commercially by DuPont under the trademark NOMEX® and fibers produced commercially by Teijin under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable polybenzazole fibers for the practice of this invention are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers for the practice of this invention are commercially available and are disclosed, for example, in U.S. Pat. Nos. 3,975,487; 4,118,372 and 4,161,470, each of which is incorporated herein by reference. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available.

M5® fibers are formed from pyridobisimidazole-2,6-diyl (2,5-dihydroxy-p-phenylene) and are manufactured by Magellan Systems International of Richmond, Va. and are described, for example, in U.S. Pat. Nos. 5,674,969, 5,939,553, 5,945,537, and 6,040,478, each of which is incorporated herein by reference. Also suitable are combinations of all the above materials, all of which are commercially available. For example, the fibrous layers may be formed from a combination of one or more of aramid fibers, UHMWPE fibers (e.g. SPECTRA® fibers), carbon fibers, etc., as well as fiberglass and other lower-performing materials. It should be understood that ballistic resistance properties may vary by fiber type.

The individual fibers forming the tapes may be of any suitable denier, such as, for example, 50 to about 3000 denier, more preferably from about 200 to 3000 denier, still more preferably from about 650 to about 2000 denier, and most preferably from about 800 to about 1500 denier. The selection is governed by considerations of ballistic effectiveness and cost. Finer fibers are more costly to manufacture and to weave, but can produce greater ballistic effectiveness per unit weight. Each fibrous tape, which include a plurality of fibers, have a preferred denier of from about 400 to about 3,000, more preferably from about 650 to about 2,400 and most preferably from about 1,000 to about 2,000.

As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. Preferred fibers also have a preferred tensile modulus of about 300 g/denier or more, more preferably about 400 g/denier or more, more preferably about 500 g/denier or more, more preferably about 1,000 g/denier or more and most preferably about 1,500 g/denier or more. Most preferred polyethylene fibers have both a tenacity of 30 g/denier or more and a tensile modulus of about 1000 g/denier or more. Most preferred aramid fibers have both a tenacity of 20 g/denier or more and a tensile modulus of about 1000 g/denier or more. Preferred fibers also have a preferred energy-to-break of about 15 J/g or more, more preferably about 25 J/g or more, more preferably about 30 J/g or more and most preferably have an energy-to-break of about 40 J/g or more. These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers. Such methods, including solution grown or gel fiber processes, are well known in the art. Methods of forming each of the other preferred fiber types, including para-aramid fibers, are also conventionally known in the art, and the fibers are commercially available. The fibrous composites of the invention also preferably comprise fibers having a fiber areal density of about 1.7 $g/cm^3$ or less.

Prior to weaving, the non-woven tapes are preferably coated with or impregnated with a polymeric binder material. The polymeric binder material either partially or substantially coats the individual fibers of the tapes, preferably substantially coating each of the individual fibers of each tape. The polymeric binder material is also commonly known in the art as a "polymeric matrix" material, and these terms are used interchangeably herein. These terms are conventionally known in the art and describe a material that binds fibers together either by way of its inherent adhesive characteristics or after being subjected to well known heat and/or pressure conditions. Such a "polymeric matrix" or "polymeric binder" material may also provide a fabric with other desirable properties, such as abrasion resistance and resistance to deleterious environmental conditions.

Suitable polymeric binder materials include both low modulus, elastomeric materials and high modulus, rigid materials. As used herein throughout, the term tensile modulus means the modulus of elasticity as measured by ASTM 2256 for a fiber and by ASTM D638 for a polymeric binder material. A low or high modulus binder may comprise a variety of polymeric and non-polymeric materials. A preferred polymeric binder comprises a low modulus elastomeric material. For the purposes of this invention, a low modulus elastomeric material has a tensile modulus measured at about 6,000 psi (41.4 MPa) or less according to ASTM D638 testing procedures. A low modulus polymer preferably has, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has a preferred elongation to break of at least about 50%, more preferably at least about 100% and most preferably has an elongation to break of at least about 300%.

A wide variety of materials and formulations having a low modulus may be utilized as the polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Düsseldorf, Germany. Particularly preferred low modulus polymeric binder polymers comprise styrenic block copolymers sold under the trademark KRATON® commercially produced by Kraton Polymers. A particularly preferred polymeric binder material comprises a polystyrene-polyisoprene-polystyrene-block copolymer sold under the trademark KRATON®.

While low modulus polymeric matrix binder materials are most useful for the formation of flexible armor, such as ballistic resistant vests, high modulus, rigid materials useful for forming hard armor articles, such as helmets, are particularly preferred herein. Preferred high modulus, rigid materials generally have a higher initial tensile modulus than 6,000 psi. Preferred high modulus, rigid polymeric binder materials useful herein include polyurethanes (both ether and ester based), epoxy resins, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. A particularly preferred rigid polymeric binder material for use in this invention is a thermosetting polymer, preferably soluble in carbon-carbon saturated solvents such as methyl ethyl ketone, and possessing a high tensile modulus when cured of at least about $1\times10^6$ psi (6895 MPa) as measured by ASTM D638. Particularly preferred rigid polymeric binder materials are those described in U.S. Pat. No. 6,642,159, the disclosure of which is incorporated herein by reference. The polymeric binder, whether a low modulus material or a high modulus material, may also include fillers such as carbon black or silica, may be extended with oils, or may be vulcanized by sulfur, peroxide, metal oxide or radiation cure systems as is well known in the art. Most specifically preferred are aqueous polyurethane dispersions within the range of both soft and rigid materials at a tensile modulus ranging from about 2,000 psi (13.79 MPa) to about 8,000 psi (55.16 MPa), which are preferably aqueous, anionic polyurethane dispersions; preferably aqueous, aliphatic polyurethane dispersions; and most preferably are or comprise aqueous, aliphatic, anionic polyurethane dispersions, all of which are preferably cosolvent free dispersions. Such includes aqueous, anionic polyester polyurethane dispersions; aqueous, aliphatic polyester-based polyurethane dispersions; and aqueous, anionic, aliphatic polyester-based polyurethane dispersions, all of which are preferably co-solvent free dispersions.

The rigidity, impact and ballistic properties of the articles formed from the composites of the invention are affected by the tensile modulus of the polymeric binder polymer coating the fibers. For example, U.S. Pat. No. 4,623,574 discloses that fiber reinforced composites constructed with elastomeric matrices having tensile moduli less than about 6,000 psi (41,300 kPa) have superior ballistic properties compared both to composites constructed with higher modulus polymers, and also compared to the same fiber structure without a polymeric binder material. However, low tensile modulus polymeric binder material polymers also yield lower rigidity composites. Further, in certain applications, particularly those where a composite must function in both anti-ballistic and structural modes, there is needed a superior combination of ballistic resistance and rigidity. Accordingly, the most appropriate type of polymeric binder polymer to be used will vary depending on the type of article to be formed from the composites of the invention. In order to achieve a compromise in both properties, a suitable polymeric binder may combine both low modulus and high modulus materials to form a single polymeric binder.

The polymeric binder material may be applied simultaneously and/or sequentially to a plurality of fibers or plurality of tapes, preferably being applied simultaneously to fibers or tapes arranged as a web (e.g. a parallel array of fibers or parallel array of tapes) to form a coated web, preferably impregnating the tapes or fiber plies/layers with the binder. As used herein, the term "impregnated with" is synonymous with "embedded in" as well as "coated with" or otherwise applied with the coating where the binder material diffuses into the tape or fiber ply/layer and is not simply on a surface of the tape fiber ply/layers. Techniques for forming impregnated nonwoven fiber plies, layers and fabrics are well known in the art.

The polymeric binder material may be applied onto the entire surface area of the individual fibers or only onto a partial surface area of the fibers. Most preferably, the coating of the polymeric binder material is applied onto substantially all the surface area of each individual fiber forming a tape of the invention. Each fiber and/or each yarn forming each tape is preferably coated with the polymeric binder material.

Any appropriate application method may be utilized to apply the polymeric binder material and the term "coated" is not intended to limit the method by which it is applied onto the filaments/fibers. The polymeric binder material is applied directly onto the fiber surfaces using any appropriate method that would be readily determined by one skilled in the art, and the binder then typically diffuses into the tape/fiber ply/fiber layer. For example, the polymeric binder materials may be applied in solution, emulsion or dispersion form by spraying, or by melting the resin and extruding or roll coating a solution of the polymer material onto fiber surfaces, wherein a portion of the solution comprises the desired polymer or polymers and a portion of the solution comprises a solvent capable of dissolving or dispersing the polymer or polymers, followed by drying. Alternately, the polymeric binder material may be extruded onto the fibers using conventionally known techniques, such as through a slot-die, or through other techniques such as direct gravure, Meyer rod and air knife systems, which are well known in the art. Another method is to apply a neat polymer of the binder material onto fibers either as a liquid, a sticky solid or particles in suspension or as a fluidized bed. Alternatively, the coating may be applied as a solution, emulsion or dispersion in a suitable solvent which does not adversely affect the properties of fibers at the temperature of application. For example, the fibers can be transported through a solution of the polymeric binder material to substantially coat the fibers and then dried.

In another coating technique, the fibers may be dipped into a bath of a solution containing the polymeric binder material dissolved or dispersed in a suitable solvent, and then dried through evaporation or volatilization of the solvent. This method preferably at least partially coats each individual fiber with the polymeric material, preferably substantially coating or encapsulating each of the individual fibers and covering all or substantially all of the filament/fiber surface area with the polymeric binder material. The dipping procedure may be repeated several times as required to place a desired amount of polymer material onto the fibers.

Other techniques for applying a coating to the fibers may be used, including coating of a gel fiber precursor when appropriate, such as by passing the gel fiber through a solution of the appropriate coating polymer under conditions to attain the desired coating. Alternatively, the fibers may be extruded into a fluidized bed of an appropriate polymeric powder.

The fibers may be coated with the polymeric binder either before or after the fibers are arranged into one or more plies, layers or tapes. However, the invention is not intended to be limited by the stage at which the polymeric binder is applied to the fibers, nor by the means used to apply the polymeric binder.

The fiber layers from which the tapes may be cut preferably comprise a plurality of overlapping fiber plies (unitapes) that are consolidated and calendered into a single-layer, monolithic element. In a typical non-woven fabric structure, a plurality of stacked, overlapping unitapes are formed wherein the parallel fibers of each single ply (unitape) are positioned orthogonally to the parallel fibers of each adjacent single ply relative to the longitudinal fiber direction of each single ply. The stack of overlapping non-woven fiber plies is consolidated under heat and pressure, or by adhering the coatings of individual fiber plies, to form a single-layer, monolithic element which has also been referred to in the art as a single-layer, consolidated network where a "consolidated network" describes a consolidated (merged) combination of fiber plies with the polymeric matrix/binder.

Most typically, such non-woven fiber layers or fabrics include from 1 to about 6 plies, but may include as many as about 10 to about 20 plies as may be desired. The greater the number of plies translates into greater ballistic resistance, but also greater weight and may make weaving difficult. Following weaving of the tapes into a woven fabric, a plurality of the tape-based woven fabrics may be merged by consolidation or molding into a complex composite. The number of fiber layers forming a composite or an article of the invention may vary as determined by one skilled in the art depending upon the desired end use of the composite or article. For example, in body armor vests for military applications, in order to form an article composite that achieves a desired 1.0 pound per square foot or less areal density (4.9 kg/m$^2$), a total of about 20 plies (or layers) to about 100 individual plies (or layers) may be required. In another embodiment, body armor vests for law enforcement use may have a number of plies/layers based on the NIJ threat level. For example, for an NIJ Threat Level IIIA vest, there may be a total of 40 plies. For a lower NIJ Threat Level, fewer plies/layers may be employed. The invention allows for the incorporation of a greater number of fiber plies to achieve the desired level of ballistic protection without increasing the fabric weight as compared to other known ballistic resistant structures.

As is conventionally known in the art, excellent ballistic resistance is achieved when individual fiber plies are cross-plied such that the fiber alignment direction of one ply is rotated at an angle with respect to the fiber alignment direction of another ply. Most preferably, the fiber plies of the non-woven fabrics from which the tapes of the invention would be cut are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

Methods of consolidating multiple fiber plies to form fiber layers as well as methods of consolidating multiple fiber layers to form complex composites are well known, such as by the methods described in U.S. Pat. No. 6,642,159. Consolidation can occur via drying, cooling, heating, pressure, calendering or a combination thereof. Heat and/or pressure may not be necessary, as the fibers or fabric layers may just be glued together, as is the case in a wet lamination process. Typically, consolidation is done by positioning the individual fiber plies or layers on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material is caused to melt, relatively little pressure is required to form the composite, while if the binder material is only heated to a sticking point, more pressure is typically required. As is conventionally known in the art, consolidation may be conducted in a calender set, a flat-bed laminator, a press or in an autoclave. Most commonly, a plurality of orthogonal fiber webs are "glued" together with the binder polymer and run through a flat bed laminator to improve the uniformity and strength of the bond. Further, the consolidation and polymer application/bonding steps may comprise two separate steps or a single consolidation/lamination step.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the composites of the invention are molded has a direct effect on the stiffness or flexibility of the resulting molded product. Particularly, the higher the pressure at which they are molded, the higher the stiffness, and vice-versa. In addition to the molding pressure, the quantity, thickness and composition of the fiber plies and polymeric binder coating type also directly affects the stiffness of the articles formed from the composites.

While each of the molding and consolidation techniques described herein are similar, each process is different. Particularly, molding is a batch process and consolidation is a generally continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber type.

To produce a fabric article having sufficient ballistic resistance properties, the total weight of the binder/matrix coating preferably comprises from about 2% to about 40% by weight, more preferably from about 5% to about 30%, more preferably from about 10% to about 20%, and most preferably from about 11% to about 16% by weight of the fibers plus the weight of the coating, wherein 16% is most preferred.

Following weaving together the tapes or following consolidation of the multi-fiber layer tapes, an optional thermoplastic polymer layer may be attached to one or both of the outer surfaces of the fiber layers or tape-based woven composite via conventional methods. Suitable polymers for the thermoplastic polymer layer non-exclusively include thermoplastic polymers non-exclusively may be selected from the group consisting of polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), Medium Density Polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France. The thermoplastic polymer layer may be bonded to the composite surfaces using well known techniques, such as thermal lamination. Typically, laminating is done by positioning the individual layers on one another under conditions of sufficient heat and pressure to cause the layers to combine into a unitary film. The individual layers are positioned on one another, and the combination is then typically passed through the nip of a pair of heated laminating rollers by techniques well known in the art. Lamination heating may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours.

The thickness of the tape-based woven fabrics will correspond to the thickness of the individual fibers and individual tapes, and the thickness of complex composites will depend on the number of woven fabrics incorporated into a complex composite. Preferably, the tape-based woven fabric will have a thickness of from about 25 μm to about 600 μm per layer, more preferably from about 50 μm to about 385 μm and most preferably from about 75 μm to about 255 μm per layer. A preferred woven or non-woven fabric precursor from which the tapes may be cut will have a preferred thickness of from about 12 μm to about 600 μm, more preferably from about 50 μm to about 385 μm and most preferably from about 75 μm to about 255 μm, wherein a single-layer, consolidated network typically includes two consolidated plies (i.e. two unitapes). Any thermoplastic polymer layers attached to the outer composite surfaces are preferably very thin, having preferred layer thicknesses of from about 1 μm to about 250 μm, more preferably from about 5 μm to about 25 μm and most preferably from about 5 μm to about 9 μm. Discontinuous webs such as SPUNFAB® non-woven webs are preferably applied with a basis weight of 6 grams per square meter (gsm). While such thicknesses are preferred, it is to be understood that other thicknesses may be produced to satisfy a particular need and yet fall within the scope of the present invention.

The tape-based woven composites of the invention will have a preferred areal density prior to consolidation/molding of from about 20 grams/m² (0.004 lb/ft² (psf)) to about 1000 gsm (0.2 psf). More preferable areal densities for the tape-based woven composites of this invention prior to consolidation/molding will range from about 30 gsm (0.006 psf) to about 500 gsm (0.1 psf). The most preferred areal density for tape-based woven composites of this invention will range from about 50 gsm (0.01 psf) to about 250 gsm (0.05 psf) prior to consolidation/molding. Articles of the invention comprising multiple tape-based woven composites stacked one upon another and consolidated will have a preferred composite areal density of from about 1000 gsm (0.2 psf) to about 40,000 gsm (8.0 psf), more preferably from about 2000 gsm (0.40 psf) to about 30,000 gsm (6.0 psf), more preferably from about 3000 gsm (0.60 psf) to about 20,000 gsm (4.0 psf), and most preferably from about 3750 gsm (0.75 psf) to about 15,000 gsm (3.0 psf). A typical range for composite articles shaped into helmets is from about 7,500 gsm (1.50 psf) to about 12,500 gsm (2.50 psf).

The fabrics of the invention may be used in various applications to form a variety of different ballistic resistant articles using well known techniques, including flexible, soft armor articles as well as rigid, hard armor articles. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of hard armor and shaped or unshaped sub-assembly intermediates formed in the process of fabricating hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. Such hard articles are preferably, but not exclusively, formed using a high tensile modulus binder material.

The ballistic resistance properties of the fibrous composites of the invention, including both $V_0$ and $V_{50}$ ballistic penetration resistance, and backface signature (backface deformation), may be measured according to well known techniques in the art.

The following examples serve to illustrate the invention.

EXAMPLES

Examples 1-2 and Example 3 (Comparative)

For Examples 1 and 2, soft armor ballistic shoot packs were prepared by loosely stacking together a plurality of tape-based woven fabric layers, each woven fabric layer being formed from a plurality of multi-fiber tapes as the warp and weft fabric components. The layers were not molded together and were clamped together for ballistic testing.

To form the tapes, fibers from 16 spools of the selected fiber type were directed through a collimating comb to form narrow 20 mm wide tapes of dry, parallel fibers. The dry fibers were dip coated through a resin bath of an epoxy thermoset resin while maintaining the fibers under uniform tension. Extra resin was squeezed out from the fiber tape by passing the tape through a set of rollers. Uniform tension was maintained by providing calibrated breaks to each spool of fiber. Once the fibers were coated, the tape was transferred to a release paper tape of corresponding width. The tape was then passed through a drying oven, during which both the release paper tape and fiber tape were kept under uniform pressure. The fiber tape with the release paper tape was collected on a narrow spool. This process was repeated to collect several narrow spools of the tape, and the spools were collected and used in a weaving operation. Each tape was approximately 20 mm wide, 3 mils thick and 1200 denier, and each tape comprised a single-ply of non-woven, unidirectional fibers. The resin content of each tape was 30% by weight based on the weight of the fibers plus the resin.

Tape-based fabrics formed from two different polyethylene fiber types were tested and are identified in Table 1.

For Comparative Example 3, a 27 layer soft armor ballistic shoot pack was formed from a SPECTRA SHIELD® style fabric rather than a tape-based woven tape fabric. Prior to forming the shoot pack, the fabric layers were cut from a continuous laminated sheet of material that comprised two consolidated plies of unidirectional, cross-plied high modulus polyethylene (HMPE) fibers impregnated with a polymeric binder composition comprising KRATON® D1107 thermoplastic binder resin. The HMPE fibers were SPECTRA® 1300 manufactured by Honeywell International Inc. and had a tenacity of 35 g/denier, a tensile modulus of 1150 g/denier and an elongation at break of 3.4% The KRATON® D1107 resin is a polystyrene-polyisoprene-polystyrene-block copolymer comprising 14% by weight styrene and is commercially available from Kraton Polymers of Houston, Tex. Each fabric layer comprised 79.5% by weight of fiber based on the weight the fabric layer, and comprised 20.5% by weight of resin. The two fiber plies of each layer were cross-plied such that the fibers of one ply were oriented at a right angle to the fibers of the second ply relative to the longitudinal fiber direction of each fiber ply (0°/90° configuration). The plies were laminated between two linear low density polyethylene (LLDPE) films, each having a thickness of approximately 9 µm and an areal density of 16 gram/m² (gsm). This construction is also known in the art as SPECTRA SHIELD® LCR, commercially available from Honeywell International, Inc. The lamination process included pressing the LLDPE films onto the cross-plied material at 110° C., under 200 psi (1379 kPa) pressure for 30 minutes, thereby forming a continuous laminated sheet of material having a thickness of 0.06" (1.524 mm). The sheet was cut to form 25 separate layers, each having a length and width of 18"×18" (45.7 mm×45.7 mm), and the total areal density of one fabric layer was 150 gsm. The 25 layers were then loosely stacked together to form the shoot pack. The layers were not molded together and were clamped together for ballistic testing. The areal density of the shoot pack was 0.84 psf.

Fragment penetration resistance of the each shoot pack was measured against a 17 grain Fragment Simulating Projectile (FSP) that conformed to the shape, size and weight as per the MIL-P-46593A. $V_{50}$ ballistic testing was conducted in accordance with the procedures of MIL-STD-662F to experimentally determine the velocity at which a projectile has a 50 percent chance of penetrating the test object. Several 17 grain FSP fragments were fired, changing the velocity of each fragment. The velocity of each fragment was moved down and up depending whether the previous fragment shot was a complete penetration or partially penetrated a few layers of the shoot pack. An average velocity was achieved by including a minimum of four partial penetrations and four complete fragment penetrations within a velocity spread of 125 fps (38.1 mps). The average velocity of the eight partial and complete penetrations was calculated and called $V_{50}$. The total specific energy absorption ("SEAT") of the shoot pack was also measured. The total SEAT is the kinetic energy of the projectile threat divided by the areal density of the composite. The higher the SEAT value, the better the resistance of the composite to the threat.

Ballistic testing results are shown in Table 1.

TABLE 1

| Example | Fiber Type | Number of layers | Areal Density (lb/ft²) | $V_{50}$ (ft/second) | SEAT (J-m²/kg) |
|---|---|---|---|---|---|
| 1 | SPECTRA® S900/1200 Denier Fiber | 35 | 0.76 | 1512 | 31.3 |
| 2 | SPECTRA® S1000/1300 Denier Fiber | 32 | 0.78 | 1549 | 32.0 |
| 3 | SPECTRA SHIELD® LCR, S1000/1300 Denier | 27 | 0.84 | 1500 | 27.8 |

Examples 4-5 and Example 6 (Comparative)

For Examples 4 and 5, Examples 1 and 2 were repeated for ballistic resistance testing against a 9 mm Full Metal Jacket (FMJ) bullet conforming to the shape, size and weight as per the National Institute of Justice (NIJ) 0101.04 test standard.

For Comparative Example 6, Comparative Example 3 was repeated for testing against the same 9 mm FMJ bullet tested in Examples 4 and 5, except the ballistic shoot pack included 25 fabric layers rather than 27. The areal density of the shoot pack was 0.77 psf.

$V_{50}$ ballistic testing was conducted in accordance with the procedures of MIL-STD-662F to experimentally determine the velocity at which a projectile has a 50 percent chance of penetrating the test object. Several 9 mm FMJ bullets were fired, changing the velocity of each bullet. The velocity of each bullet was moved down and up depending whether the previous bullet shot was a complete penetration or partially penetrated a few layers of the shoot pack. An average velocity was achieved by including a minimum of four partial penetrations and four complete bullet penetrations within a velocity spread of 125 fps (38.1 mps). The average velocity of the eight partial and complete penetrations was calculated and called $V_{50}$. The total specific energy absorption ("SEAT") of the shoot pack was also measured.

Ballistic testing results are shown in Table 2.

TABLE 2

| Example | Fiber/Material Type | Number of layers | Areal Density (lb/ft$^2$) | $V_{50}$ (ft/second) | SEAT (J-m$^2$/kg) |
|---|---|---|---|---|---|
| 4 | SPECTRA ® S900/1200 Denier Fiber | 35 | 0.76 | 1354 | 25.1 |
| 5 | SPECTRA ® S1000/1300 Denier Fiber | 32 | 0.78 | 1380 | 25.4 |
| 6 (Comp) | SPECTRA SHIELD ® LCR, S1000/1300 Denier | 25 | 0.77 | 1430 | 27.6 |

Examples 7-8 and Example 9 (Comparative)

For Examples 7 and 8, Examples 4 and 5 were repeated for ballistic resistance testing against a 9 mm FMJ bullet, except the shoot packs were molded together to form hard armor panels. Molding was conducted in a press at approximately 240° F. (115° C.) and under a pressure of about 2,777 psi for about 15-30 minutes, followed by cooling the molded panel.

For Comparative Example 9, a hard armor ballistic panel was molded from a SPECTRA SHIELD® PCR rather than a tape-based woven tape fabric. Each layer comprised a four-ply HMWPE fiber composite which was a non-woven unidirectionally oriented structure formed from SPECTRA® S 1000/1300 denier fibers. The fibers were coated with a resin comprising Kraton® D1107 isoprene-styrene-isoprene block copolymer available from Kraton Polymers LLC. The resin content of each tape was 16% by weight based on the weight of the fibers plus the resin. The 4-ply structure included individual plies that were cross-plied 0°/90°/0°/90°. The SPECTRA® polyethylene fibers have a tenacity of 30 g/d, a tensile modulus of 850 g/d and energy-to-break of 45 g/d. This construction is also known in the art as SPECTRA SHIELD® PCR, commercially available from Honeywell International, Inc. The total areal density of one fabric layer was 150 gsm. The areal density of the molded panel was 4.88 ksm. The layers were molded together to form hard armor.

Ballistic testing results are shown in Table 3.

TABLE 3

| Example | Fiber/Material Type | Areal Density (lb/ft$^2$) | $V_{50}$ (ft/second) | SEAT (J-m$^2$/kg) |
|---|---|---|---|---|
| 7 | SPECTRA ® S900/1200 Denier Fiber | 0.88 | 1522 | 27.37 |
| 8 | SPECTRA ® S1000/1300 Denier Fiber | 0.88 | 1490 | 26.23 |
| 9 (Comp) | SPECTRA SHIELD ® PCR, S1000/1300 Denier | 1.00 | 1700 | 30.05 |

Example 10 and Example 11 (Comparative)

For Example 10, a soft armor ballistic shoot pack was prepared as in Examples 1 and 4, except the component fibers of each tape were TWARON® T2000/1000 denier aramid fibers rather than polyethylene fibers. Each tape was approximately 20 mm wide, 2.5 mils thick and 1000 denier, and comprised a single-ply of non-woven, unidirectional fibers. The fibers of each tape were coated with an epoxy thermoset resin. The resin content of each tape was 30% by weight based on the weight of the fibers plus the resin.

For Comparative Example 11, a 17 layer soft armor ballistic shoot pack was formed from a SPECTRA SHIELD® style fabric rather than a tape-based woven tape fabric. Prior to forming the shoot pack, the fabric layers were cut from a continuous laminated sheet of material that comprised four consolidated plies of unidirectional, cross-plied high strength aramid fibers impregnated with a polymeric binder composition comprising epoxy and consolidated with plastic films on both exterior surfaces. As in Example 10, the aramid fibers were TWARON® T2000/1000 denier aramid fibers. This construction is also known in the art as GOLD FLEX®, commercially available from Honeywell International Inc. The shoot pack had dimensions of 16"×16"×0.216" (41 cm×41 cm×0.549 cm). The layers were not molded together and were clamped together for ballistic testing. The areal density of the shoot pack was 0.81 psf.

The shoot packs of both Examples 10 and 11 were tested against 9 mm FMJ bullets as in Examples 4-6.

Ballistic testing results are shown in Table 4.

TABLE 4

| Example | Fiber/Material Type | Number of layers | Areal Density (lb/ft$^2$) | $V_{50}$ (ft/second) | SEAT (J-m$^2$/kg) |
|---|---|---|---|---|---|
| 10 | TWARON ® T2000/1000 Denier Fiber | 33 | 0.76 | 1369 | 25.6 |
| 11 (Comp) | GOLD FLEX ®, TWARON ® T2000/1000 Denier Fiber | 17 | 0.81 | 1550 | 30.8 |

Example 12 and Example 13 (Comparative)

For Example 12, Example 10 was repeated except the stack of fiber layers was molded together to form hard armor.

Molding was conducted in a press at approximately 240° F. (115° C.) and under a pressure of about 2777 psi for about 15-30 minutes, followed by cooling the molded panel. The areal density of the shoot pack was 0.88 psf.

Similarly, for Example 13, Example 11 was repeated except the stack of fiber layers was molded together to form hard armor The shoot packs of both Examples 12 and 13 were tested against 17 grain FSPs as in Examples 1-3.

Ballistic testing results are shown in Table 5.

TABLE 5

| Example | Fiber/Material Type | Number of layers | Areal Density (lb/ft$^2$) | $V_{50}$ (ft/second) | SEAT (J-m$^2$/kg) |
|---|---|---|---|---|---|
| 12 | TWARON ® T2000/1000 Denier Fiber | 33 | 0.88 | 1424 | 24.1 |
| 13 (Comp) | GOLD FLEX ®, TWARON ® T2000/1000 Denier Fiber | 17 | 0.73 | 1430 | 29.1 |

From the above examples, it has been found that the woven tape composites of the invention have good ballistic performance against both 17 grain fragment simulating projectiles and 9 mm FMJ bullets for both soft and hard armor. The polyethylene fiber-based materials performed better than the aramid fiber-based materials. It was found that the ballistic performance of the SPECTRA SHIELD® style fabrics were better than the inventive woven tape composites, but at heavier weights. At lower weights, the lighter inventive materials had good ballistic resistance performance. Specifically, the tape making process allows both soft ballistic armor and molded hard ballistic armor having a resin content of about 10 wt. % or less to perform either similarly or with higher fragment and bullet resistance than comparable composites having a resin content of greater than 10 wt. %.

While the present invention has been particularly shown and described with reference to preferred embodiments, it will be readily appreciated by those of ordinary skill in the art that various changes and modifications may be made without departing from the spirit and scope of the invention. For example, tapes comprising narrow woven tapes, such as narrow ribbons, may be coated with a polymeric binder material or resin, and may optionally be laminated with one or more outer polymeric films, such as one or more polyethylene films. Additionally, tapes formed from non-woven, unidirectionally oriented fibers may be fabricated without a polymeric binder material or resin coating, where a polymeric surface film is optionally applied onto the outer fiber surfaces to aid in holding the fibers together. It is intended that the claims be interpreted to cover the disclosed embodiments, those alternatives which have been discussed above and all equivalents thereto.

What is claimed is:

1. A woven fabric comprising a plurality of fibrous tapes, wherein said woven fabric has fibrous tapes woven together in both a warp direction and a weft direction, and each fibrous tape comprising a plurality of fibers arranged in a unidirectional, substantially parallel array or arranged as a woven fabric strip, said fibers optionally being at least partially coated with a polymeric binder material, wherein each of said fibers have a tenacity of about 7 g/denier or more and a tensile modulus of about 150 g/denier or more, wherein each fiber comprises a plurality of filaments, and wherein said polymeric binder material when present comprises less than 40% by weight of each fibrous tape.

2. The woven fabric of claim 1 wherein said woven fabric comprises from about 0.25 to about 6 fibrous tapes per inch in each of the warp and weft directions, wherein each tape has a width of from about 5 mm to about 50 mm.

3. The woven fabric of claim 1 wherein each fibrous tape comprises a plurality of fibers arranged in a unidirectional, substantially parallel array, wherein each fibrous tape comprises from 2 to about 20 fibers, wherein each tape has a width of from about 5 mm to about 50 mm, wherein the fibers of each tape are coated with a polymeric binder material, and wherein each fiber comprises from about 30 to about 2000 individual filaments.

4. The woven fabric of claim 1 wherein each fibrous tape has a denier of from about 1,000 to about 3,000.

5. The woven fabric of claim 1 wherein each fibrous tape has a width of from about 5 mm to about 50 mm and a thickness of from about 0.35 mil (8.89 μm) to about 3 mils (76.2 μm).

6. The woven fabric of claim 1 wherein each fibrous tape comprises a single ply of non-woven, unidirectionally oriented, substantially parallel fibers, wherein said fibers have a tenacity of about 30 g/denier or more.

7. The woven fabric of claim 1 wherein each fibrous tape comprises a plurality of non-woven fiber plies, each non-woven fiber ply comprising a plurality of non-woven, unidirectionally oriented, substantially parallel fibers, said plurality of non-woven fiber plies being consolidated as a single, unitary tape.

8. The woven fabric of claim 1 wherein each fibrous tape comprises a woven fabric strip, wherein each woven fabric strip comprises one or more woven fiber layers.

9. The woven fabric of claim 1 wherein each fibrous tape has an outer top surface and an outer bottom surface, and wherein at least one of said fibrous tapes further comprises a polymer film attached to at least one of said outer surfaces of the fibrous tape.

10. The woven fabric of claim 1 wherein each fibrous tape comprises polyethylene fibers.

11. The woven fabric of claim 1 wherein said fibers have a tenacity of about 20 g/denier or more and a tensile modulus of about 1000 g/denier or more.

12. The woven fabric of claim 1 wherein said polymeric binder material is present and comprises a thermoplastic polymer and/or a thermoset polymer, and wherein said polymeric binder material comprises from about 5% to about 30% by weight of each fibrous tape.

13. The woven fabric of claim 12 wherein said polymeric binder material comprises from about 10% to about 20% by weight of each fibrous tape, and wherein the polymeric binder material substantially coats each of the individual fibers of each fibrous tape.

14. A multi-layer, ballistic resistant composite comprising a consolidated plurality of woven fabrics, each woven fabric comprising a plurality of fibrous tapes, each fibrous tape comprising a plurality of fibers arranged in a unidirectional, substantially parallel array or arranged as a woven fabric strip, said fibers optionally being at least partially coated with a polymeric binder material, wherein each of said fibers have a tenacity of about 7 g/denier or more and a tensile modulus of about 150 g/denier or more, wherein each fiber comprises a plurality of filaments, and wherein said polymeric binder material when present comprises less than 40% by weight of each fibrous tape.

15. The multi-layer, ballistic resistant composite of claim 14 wherein each fibrous tape comprises plurality of nonwoven fiber plies, each non-woven fiber ply comprising a plurality of non-woven, unidirectionally oriented, substantially parallel fibers, said plurality of non-woven fiber plies being consolidated as a single, unitary tape, wherein adjacent non-woven fiber plies of said unitary tape are cross-plied wherein the fibers of each non-woven fiber ply are oriented at an angle relative to the fibers of the each adjacent non-woven fiber ply of said unitary tape.

16. The multi-layer, ballistic resistant composite of claim 14 wherein said composite has a top outer surface and a bottom outer surface, and wherein a polymer film is attached to at least one of said outer surfaces.

17. The multi-layer, ballistic resistant composite of claim 14 wherein each fibrous tape comprises polyethylene fibers and wherein the polymeric binder material substantially coats each of the individual fibers of each fibrous tape.

18. A woven fabric comprising a plurality of fibrous tapes, each fibrous tape comprising a plurality of non-woven polyethylene fibers, each fibrous tape having a width of from about 5 mm to about 50 mm and a thickness of from about 0.35 mil (8.89 μm) to about 3 mils (76.2 μm), said fibrous tapes being impregnated with a polymeric binder material, wherein each of said fibers has a tenacity of 20 g/denier or more and a tensile modulus of 150 g/denier or more, wherein each fiber comprises a plurality of filaments, and wherein said polymeric binder material comprises from about 5% to about 30% by weight of each fibrous tape.

19. The woven fabric of claim 18 wherein each fibrous tape has an outer top surface and an outer bottom surface, and wherein a polymer film is attached to at least one of said outer surfaces of at least one of said fibrous tapes.

20. The woven fabric of claim 18 wherein the polymeric binder material substantially coats each of the individual fibers of each fibrous tape.

* * * * *